United States Patent [19]
Buck

[11] 3,731,942
[45] May 8, 1973

[54] HYDRAULICALLY ACTUATED TOOL COLLET
[75] Inventor: James R. Buck, Richland, Mich.
[73] Assignee: Buck Tool Company, Kalamazoo, Mich.
[22] Filed: Sept. 30, 1970
[21] Appl. No.: 76,884

[52] U.S. Cl. ....................................279/4
[51] Int. Cl. .................................B23b 31/36
[58] Field of Search............................279/4

[56] References Cited

UNITED STATES PATENTS

| | | | |
|---|---|---|---|
| 3,103,144 | 9/1963 | Walter | 279/4 X |
| 3,117,797 | 1/1964 | Buck | 279/2 |
| 3,516,681 | 6/1970 | Cox et al. | 279/4 |
| 3,542,354 | 11/1970 | Fitzpatrick | 279/4 X |
| 1,295,994 | 3/1919 | Lavoie | 279/4 |
| 3,507,507 | 4/1970 | Tobler et al. | 279/2 |

*Primary Examiner*—Granville Y. Custer, Jr.
*Attorney*—Woodhams, Blanchard & Flynn

[57] ABSTRACT

An improved chuck construction, particularly for holding a work tool, comprising a housing and a gripping sleeve mounted on the housing for relative axial movement therebetween. The housing and the gripping sleeve are each provided with a plurality of circumferentially spaced cam rows, with each row including a plurality of axially spaced ramp-like cams. The cam rows on the gripping sleeve and on the housing coact with one another in response to relative axial movement therebetween for causing the sleeve to deform radially so as to grip a tool. A captive or closed fluid system cooperates with the sleeve for moving same axially relative to the housing, which system includes a manually actuated member, such as a set screw, for causing the pressure of the fluid within the system to vary so as to cause relative axial movement of the sleeve relative to the housing and so as to cause the sleeve to be radially deformed into gripping engagement with the tool.

2 Claims, 6 Drawing Figures

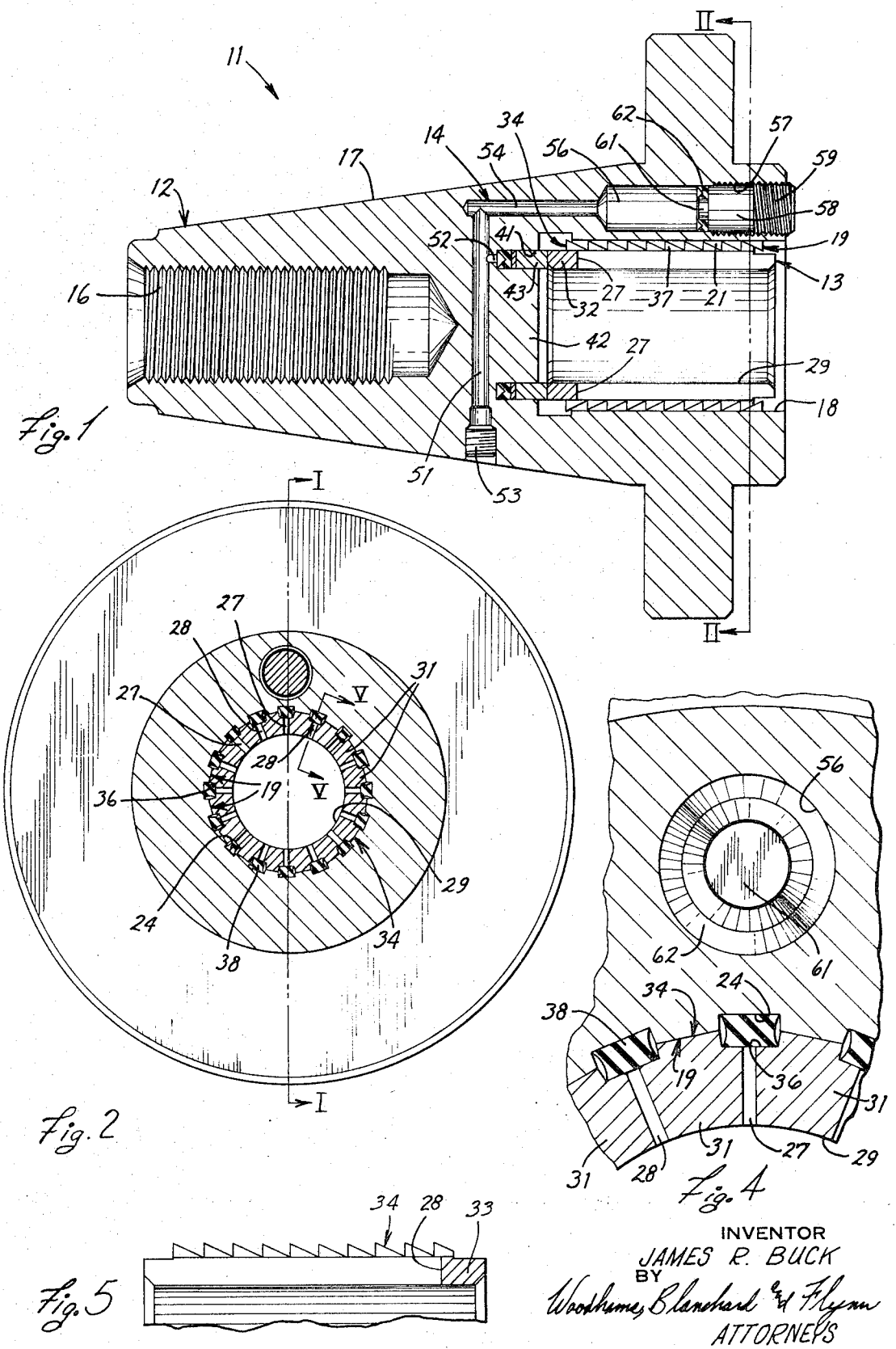

INVENTOR
JAMES R. BUCK
BY
Woodhams, Blanchard & Flynn
ATTORNEYS

HYDRAULICALLY ACTUATED TOOL COLLET

FIELD OF THE INVENTION

This invention relates to an improved chuck construction and, in particular, relates to a chuck construction particularly suitable for holding a work tool and having a large plurality of cooperating ramp-like cams provided both axially and circumferentially between a housing and a gripping sleeve for permitting the tool to be securely gripped at a large plurality of points in response to relative axial movement between the gripping sleeve and the housing. The chuck includes a captive fluid system provided in the housing for imposing a relatively large force on the gripping sleeve to move same axially relative to the housing.

BACKGROUND OF THE INVENTION

Previously known chuck constructions for gripping and supporting a work tool are normally provided with collets, with one or two cones. Such tool holder assemblies normally comprise the collet and an actuating member each having cooperating and continuous tapered surfaces thereon for causing the collet to be moved radially to grip the tool in response to axial displacement of the actuating member.

While tool holder constructions of the above-described type have operated satisfactorily in that they minimize, if not substantially eliminate, audible tool chatter, nevertheless it has been discovered that such tool holder constructions still inherently result in some inaccuracy in the mounting of the tool, which inaccuracy substantially minimizes the useful tool life.

Particularly, since most tool holders normally contain only one or two contact surfaces, the collets are capable of contacting the tool at only a limited number of circumferentially spaced locations. Further, due to the manufacturing inaccuracies and tolerances which inevitably exist within each of the individual tool holder assemblies, particularly due to the inaccuracies between the cooperating tapered surfaces as formed on the actuating member and the collet, it has been determined that a uniform clamping pressure does not exist axially throughout the length of the cooperating tapered surfaces, but rather the clamping pressure between the tapered surfaces is generally transmitted between the surfaces at only limited and irregularly located points on each collet. This in turn results in the clamping pressure applied to the workpiece by the collet being applied to the tool at only limited and irregularly located points. Thus, conventional tool holders often contact and grip the tool at only a small number of points, and even these are often so irregularly located as to inhibit good precision work.

The small number of contact points between the collet and the tool, as described above, often permits a limited, though small, amount of wobbliness and/or deflection of the tool, which wobbliness or deflection is sufficient to substantially increase the wear rate of the tool, while at the same time the wobbliness or deflection is not excessive enough to cause undesired audible chatter. Thus, such wobbliness or deflection generally goes undetected, except for the fact that it substantially increases the wear of the tool.

Further, since conventional tool holders result in only a small number of contact points between the collet and the tool shank, this greatly limits the clamping force which can be applied to the tool shank, since the force must be maintained at a relative small value to prevent excessive damage to the tool shank. This necessarily results in substantially limiting or minimizing the torque which can be applied to the tool, which in turn often restricts the cutting or machining rate.

Accordingly, it is an object of the present invention to provide an improved chuck construction for gripping and supporting a work tool, which chuck construction overcomes the above-mentioned disadvantages. Specifically, it is an object of the present invention:

1. To provide an improved chuck construction, particularly for supporting and gripping a work tool, which is capable of securely and rigidly supporting the tool so as to result in a substantial increase in the working life of the tool.

2. To provide a tool holder construction, as aforesaid, which provides for a large number of contact points between the gripping sleeve and the tool shank for uniformly and rigidly gripping the tool.

3. To provide a tool holder construction, as aforesaid, having a housing and a cooperating deformable gripping sleeve each provided with a plurality of circumferentially spaced cam rows, with each cam row including a plurality of axially spaced ramp-like cams, the cam rows cooperating in response to relative axial movement between the housing and the gripping sleeve for causing the gripping sleeve to radially deform into contact with the tool shank at a large plurality of axially and circumferentially spaced locations.

4. To provide a tool holder construction, as aforesaid, capable of transmitting increased torque to the tool.

5. To provide a tool holder construction, as aforesaid, having a captive fluid system for actuating the collet and for permitting a large actuating force to be applied to the gripping sleeve in an easy and simple manner.

6. To provide a tool holder construction, as aforesaid, wherein the captive fluid system results in a force magnification and imposes an increased clamping force to the gripping sleeve, as permitted by the large plurality of contact points between the gripping sleeve and the tool.

7. To provide a tool holder construction, as aforesaid, which substantially eliminates the tool deflection encountered in conventional tool holder constructions, which substantially eliminates tool wobbliness and maintains the tool substantially rigid and parallel to the rotational axis of the tool holder, which can transmit increased driving torque to the tool, and which substantially minimizes tool wear, impact and chatter and greatly increases the number of operational cutting cycles of the tool prior to requiring resharpening.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a central sectional view of an improved tool holder construction according to the present invention, as taken along the line I—I of FIG. 2.

FIG. 2 is a sectional view taken along the line II—II of FIG. 1.

FIG. 4 is an enlarged, fragmentary, sectional view taken along the line IV—IV of FIG. 3.

FIG. 5 is a fragmentary sectional view taken along the line V—V of FIG. 2.

Figure 3:
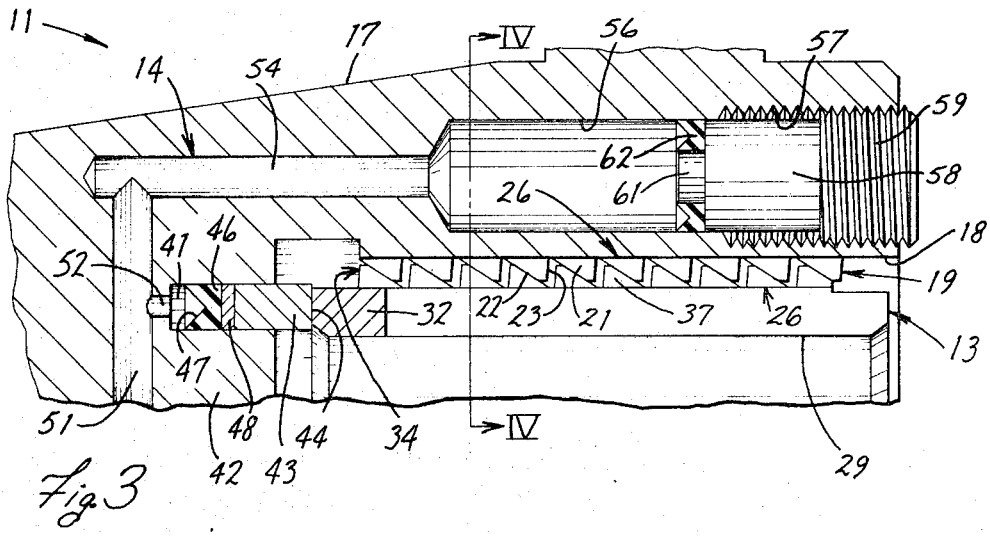
FIG. 3 is an enlarged, fragmentary, sectional view illustrating a portion of the tool holder construction of FIG. 1.

Certain terminology will be used in the following description for convenience in reference only and will not be limiting. For example, the words "upwardly," "downwardly," "leftwardly" and "rightwardly" will refer to directions in the drawings to which reference is made. The words "front" and "rear" will refer, respectively, to the tool receiving end and the mounting end of the tool holder construction, same being the rightward and leftward ends, respectively, of the tool holder as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing an improved tool holder construction including a housing and a resiliently deformable gripping sleeve disposed within a bore formed in the housing, the gripping sleeve being adapted to have the shank of a tool positioned within the interior thereof. The housing and the gripping sleeve are each provided with a plurality of cooperating, circumferentially spaced cam rows, with each cam row including a plurality of axially spaced ramp-like cams formed thereon. The cam rows on the housing and the gripping sleeve are disposed in axial sliding engagement with one another whereby axial sliding movement of the gripping sleeve relative to the housing causes the sleeve to be resiliently contracted into rigid gripping engagement with the shank of the tool. Due to the large number of axially and circumferentially spaced cams between the housing and the gripping sleeve, the compressing force applied to the gripping sleeve is applied substantially uniformly, both circumferentially and axially, and thus the sleeve grips the shank of the tool at a large plurality of contact points or locations so as to rigidly and fixedly grip the tool, thereby eliminating tool deflection and/or wobbliness.

The tool holder construction is also provided with a captive fluid system for applying an axially directed force to the gripping sleeve so as to actuate same. The captive fluid system includes a closed fluid passageway system communicating with an annular chamber, which chamber is provided with an annular ring-like piston slidably disposed therein, the piston being adapted to abut against one end of the gripping sleeve for displacing same axially. The closed system includes a pressure creating device for enabling the pressure of the fluid within the system to be easily and selectively increased so as to apply pressure to the piston, which pressure due to the area relationship between the piston and the actuating member preferably results in a force magnification. The axial displacement of the gripping sleeve by the piston causes the gripping sleeve to be resiliently deformed or contracted into gripping engagement with the shank of the tool. The large number of contact points between the gripping sleeve and the tool permits the use of a large fluid clamping pressure and force without risk of damage to the tool, whereupon substantially increased driving torque can be transmitted to the tool.

DETAILED DESCRIPTION

FIGS. 1-5 illustrate therein a tool holder construction 11 which has been chosen to illustrate the present invention. The tool holder construction 11 specifically includes a housing or body 12 having a contractable tool engaging member 13 mounted thereon, same being actuated by a fluid actuator means 14.

The body 12 is of a generally annular configuration and is provided with a threaded opening 16 adjacent its rearward end, which rearward end of the chuck body is also provided with a conventional tapered exterior surface 17. The threaded opening 16 and/or conical surface 17 are used for permitting the chuck body 12 to be fixedly mounted on a machine tool in a conventional manner. However, the exact shape or configuration of the rearward end of the housing 12 may substantially depart from that as illustrated without departing from the novel tool holder construction according to the present invention since it will be readily recognized by those familiar with devices of this type that numerous types of conventional mounting structures could be provided for securing the chuck body to a related machine.

The forward end of the body 12 is provided with a bore 18 therein, which bore 18 is surrounded by a series of circumferentially spaced, axially extending cam rows 19, each of which is comprised of a series of axially spaced, ramp-like cams 21. The cams 21 are fixedly, here integrally, connected to the body 12 and project radially inwardly into the bore 18.

As best shown in FIG. 3, the ramp side 22 of each individual cam 21 is relatively long and extends at a suitable, relatively small angle, such as 22½ degrees, to the longitudinal axis of the body 12. The front face 23 of each cam 21, in this embodiment of the invention, extends at a large angle, but less than 90 degrees, to the axis of the body 12 but this is for manufacturing and clearance purposes only. Axially extending slots 24 (FIG. 4) are provided between the adjacent cam rows 19, the slots preferable being of approximately the same circumferential width as the cam rows. It is to be noted that the cams 21 are also arranged in separate circumferential rows 26, each circumferential row 26 including a cam 21 in each of said axially extending rows 19.

Referring now to the contractable tool engaging member 13, same comprises a substantially cylindrical sleeve or collet having a tool receiving opening 29 therein, the collet being coaxially disposed within the bore 18. The collet has a series of alternately arranged slots 27 and 28 (FIGS. 2 and 4) formed therein and extending axially thereof, which slots divide the collet 13 into a plurality of segments 31 which are movable substantially radially with respect to each other to a limited extent. The segments 31 are connected to each other by end portions 32 (FIGS. 1 and 3) and 33 (FIG. 5) which are located at alternately opposite axial ends of the slots 27 and 28, respectively.

The outer surface of the contractable collet 13 is provided with a series of circumferentially spaced, axially extending cam bars 34. Axially extending slots 36 are provided between the bars 34 and said bars each comprise a series of axially spaced ramp-like cams 37. The cross-sectional shape, size and spacing of the cams 37 are substantially the same as those of the cams 21 and said cams 37 and 21 are adapted to interfit. The slots 24 and 36 are of sufficient radial depth that the cams 37 and 21, respectively, are movable axially therethrough. Thus, the housing 12 and the contractable collet 13 can be assembled by aligning the cam bars 34 of the contractable collet 13 within the slots 24 of the housing 12, which also aligns the cam rows 19 with the slots 36, whereupon the parts are then telescoped until the cams 37 are circumferentially aligned with selected spaces between the cams 21, with the contractable collet 13 then being rotated sufficiently with respect to the body 12 to effect interengagement of the cams 21 and 37. In such position each slot 36 will be radially aligned with a corresponding slot 24.

The contractable collet 13 can be releasably locked relative to the housing 12 by inserting a key 38 into at least one of the sets of aligned slots 24 and 36. For many uses such a single key will be sufficient. However, if desired, a key 38 may be disposed within more than one, or all, of the pairs of aligned slots 24 and 36. The keys 38 will prevent relative rotation between the housing 12 and the collet 13, and will additionally tend to prevent the entry of dust, dirt and other foreign material into the slots so as to thus protect the interengaging cammed surfaces from damage.

Since there is little tendency for the contractable collet 13 to rotate with respect to the housing 12 due to the substantial deflection which exists between the cams 21 and 37, it is generally sufficient for keying purposes if the keys 38 are made from a resilient, plastic material, with the keys having a normal cross-sectional area substantially equal to the cross-section of the aligned slots so that the keys will be snugly received therein.

Further details of the cam rows and key structure are illustrated in greater detail in my prior U.S. Pat. No. 3,117,797, and thus further description thereof is not believed necessary.

Considering now the fluid actuator means 14, same includes an annular ring-like recess 41 (FIG. 3) formed within the body 12 adjacent the rearward end of the bore 18. The ring-like recess 41 results in the formation of an annular hub-like projection 42 which, in the embodiment illustrated in FIGS. 1 and 3, is integral with the housing 12. An annular ring-like piston or slide 43 is snugly and slidably received within the recess 41, the piston 43 being movable axially of the recess 41 in a direction substantially parallel to and coaxial with the longitudinal axis of the bore 18. The piston 43 has an annular end face 44 which is adapted to abut against the rearward end of the collet 13. A resilient annular seal ring 46, preferably of an elastomeric material and which may be of any convenient type for holding a high substantially static pressure, is slidably disposed within the recess 41 adjacent the other (leftward in FIG. 3) end of the piston 43, the seal ring 46 abutting or being bonded to a backing ring 48, which backing ring in turn abuts the piston 43. The seal ring in this embodiment has a notch 47 in the rearward face thereof, which may if desired have an O-ring therein, so as to give the seal ring a substantially V-shaped configuration whereby the presence of pressurized fluid within the notch causes the inner and outer flanges of the seal ring to be expanded into tight sealing engagement with the inner and outer annular walls defining the recess 41.

To provide for flow of fluid to the recess 41, the housing 12 has formed therein a transverse passageway 51, which passageway 51 communicates with the recess 41 by means of an intermediate passageway 52. The outer end of the transverse passageway 51 is sealingly closed by means of a removable threaded plug 53.

The inner end of the transverse passageway 51 communicates with the inner end of a further passageway 54 which extends substantially parallel with and laterally offset from the longitudinal axis of the housing 12. The outer end of the passageway 54 is in this embodiment, and preferably, provided with an enlarged bore 56, which bore 56 is provided with a threaded portion 57 adjacent the outer free end thereof. A pressure creating plug or actuating member 58 is disposed within the enlarged bore 56 and has a threaded portion 59 which is disposed in threaded engagement with the threaded portion 57 of the bore for sealingly closing the outer end of the passageway 54. The plug 58 has an effective pressure area, that is a cross-sectional area, which is substantially less than the effective pressure or cross-sectional area of the piston 43 for a purpose to be explained hereinafter. The plug 58 is provided with a reduced diameter projecting portion 61 adjacent the inner end thereof, which portion has a resilient annular seal ring 62, also preferably of an elastomeric material, encircling the portion 61. The seal ring 62 is also of a V-shaped configuration and seals both the projection 61 and the annular wall defining the bore 56. The outer end of the plug 58 is preferably provided with tool engaging means thereon, such as a slot for a screwdriver or a socket for a wrench, so as to enable the axial position of the plug to be selectively varied by rotating same within the threaded bore portion 57.

The passageways 51, 52 and 54, in conjunction with that portion of the recess 41 disposed rearwardly of the seal ring 46, thus define a closed chamber in which is captured a predetermined quantity of a substantially noncompressible fluid, the fluid being sufficient to substantially fill the chamber. While the chamber could be filled with conventional hydraulic fluid or oil if desired, it is preferable to utilize a more viscous material since there is less tendency for the material to leak from the closed chamber. Thus, in a preferred embodiment, the chamber is preferably filled with a jelly-like material, such as a silicone gel.

OPERATION

When it is desired to utilize the tool holder construction 11, same will be initially moved to the released position illustrated in FIG. 1, in which position the collet 13 is in its fully expanded condition and the piston 43 is retracted rearwardly into the recess 41, the fluid in the closed chamber being subjected to little, if any, pressure.

With the tool holder construction released as described above, the shank of a tool will then be inserted into the tool receiving opening 29. The pressure creating plug 58 will then be rotated by any suitable tool so as to move the plug 58 axially into the bore 56 so as to exert a pressure on the confined fluid, which pressure is transmitted to the fluid contained within the recess 41. The pressure of the fluid within the recess causes the V-shaped seal ring 46 to expand outwardly into tight sealing engagement with the inner and outer annular walls defining the recess 41, while at the same time the pressurized fluid within the recess 41 tends to move the piston 43 axially outwardly (rightwardly in FIG. 1). Since the cross-sectional area of the recess 41 and piston 43 is preferably substantially greater than the cross-sectional area of the bore 56 (or plug 58), the pressure force as developed by rotation of the pressure creating plug 58 is, when transmitted through the fluid, substantially magnified when applied to the piston 43. The pressure-created force as transmitted from piston 43 to collet 13 thus causes the collet to move outwardly (rightwardly in FIG. 1) whereupon the cams 37 on the collet 13 slidably engage the cams 21 on the housing 12, which in turn causes the segments 31 of the collet to be inwardly radially deformed whereupon the collet is thus contracted into gripping engagement with the shank of the tool. The magnitude of the gripping engagement between the collet 13 and the shank of the work tool is determined by the amount of inward displacement of the pressure creating plug 58, and the collet 13 is maintained in gripping engagement with the shank of the tool by maintaining the plug 58 in the advanced position whereupon the fluid contained within the closed chamber is thus maintained in a pressurized condition.

When it is desired to release the shank of the tool, the pressure creating plug 58 will then be rotated in the opposite direction so as to axially retract the plug outwardly, thereby relieving the pressure on the fluid contained within the closed chamber. The release of the pressure on the fluid will thus result in a release of the clamping force as applied to the leftward end of the collet 13, whereupon the natural resiliency of the collet will cause it to radially expand and, due to the taper of the cooperating cams 21 and 37, the radial expansion of the collet 13 will be accompanied by a leftward axial movement of the collet back into its released position as illustrated in FIG. 1.

When the collet 13 is contracted to grippingly engage the shank of a tool, as explained above, the collet is able to grip the shank at a large number of points which are spaced both axially and circumferentially around the shank of the tool. This uniform and multiple gripping of the tool shank is possible since each cam bar 34 contains a plurality of individual cams 37 thereon, the illustrated embodiment utilizing ten cams within each axial row but this number may be decreased or increased. Thus, this construction is not subjected to the problems associated with conventional tool holders which utilize a single continuous cam, which continuous cam normally results in force transfer at only a few, irregularly located, points as described above. Rather, since the present invention utilizes a plurality of axially spaced cams within each row, each pair of cooperating cams will result in at least one contact point, thereby providing a large number of force transfer points within each axial row.

The present invention also provides a large number of circumferentially spaced rows of cams, the illustrated embodiment being provided with 16 different axial rows of cams but this number may be decreased or increased. This thus results in the shank of the tool being gripped in at least the same large number, as 16, different circumferentially spaced locations, which thus results in a much more secure gripping of the shank than is possible in conventional tool holder constructions wherein only limited contacts are provided.

Thus, it is readily apparent that the tool holder construction according to the present invention results in the tool shank being securely gripped due to its being contacted at a large plurality of axially and circumferentially spaced locations. Also, inasmuch as such a large number of contact points are provided with the tool shank, the total gripping or holding force applied to the tool shank can be substantially increased without excessive force being applied at any one point with the result that a substantially greater torque can be applied to the shank of the tool by means of the chuck construction 11.

The secure and rigid gripping of the tool shank is particularly advantageous since it substantially eliminates tool deflection when the tool is disposed in working or cutting engagement with a workpiece. For example, in experimental tests conducted by Applicant with a conventional tool holder, it was experimentally determined that a tool could be made to perform approximately 50 operational cutting cycles, at which time the tool then had to be removed from the tool holder and resharpened. On the other hand, when the same tool was mounted in the tool holder according to the present invention and subjected to the same cutting cycles, it was experimentally observed that the tool was able to successfully undergo a much greater number of operational cutting cycles. In one experiment, the tool was subjected to 200 operational cutting cycles and was then removed from the tool holder and inspected, which inspection revealed that the tool had been subjected to very little wear and thus the tool was repositioned within the tool holder and subjected to additional cutting cycles without being resharpened. The chuck construction according to the present invention, in the above experimental test, thus resulted in at least a fourfold increase in the tool life.

MODIFICATION

Figure 6:
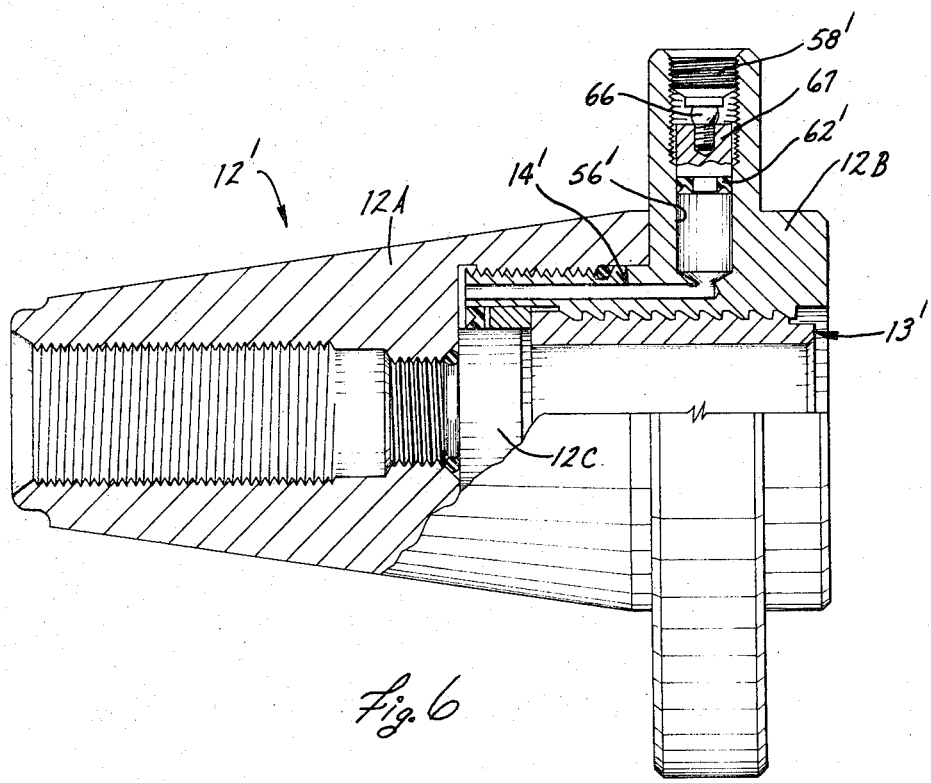
FIG. 6 is a longitudinal sectional view of a modified chuck construction according to the present invention.

FIG. 6 illustrates therein a tool holder construction which is similar to the tool holder construction illustrated in FIG. 1. However, the tool holder construction illustrated in FIG. 1 utilizes a one-piece housing 12, whereas the embodiment illustrated in FIG. 6 utilizes a three-piece housing 12'. Particularly, the housing 12' illustrated in FIG. 6 comprises a tapered shank portion 12A and a front flange portion 12B, which portions are threadably fixedly connected together in the manner illustrated in FIG. 6. The housing further includes a separable hub 12C fixedly threadably connected to the tapered shank 12A. The hub 12C cooperates with the flange portion 12B to define an annular fluid chamber or recess therebetween.

The tool holder construction 12' of FIG. 6 also has the bore 56' formed within and extending radially outwardly of the enlarged radial flange as formed on the housing part 12B, the bore 56' again having a threaded plug or pressure creating member 58' threadably engaged within the outer end thereof. The threaded plug 58' bears against a ball 66 which in turn bears against a separate pressure creating piston 67, which piston 67 is slidably disposed within the bore 56'. The piston 67 has a resilient annular seal ring 62' disposed on the forward end thereof. Except for the radial orientation of the bore 56', and the use of a separate threaded plug and piston having a ball disposed therebetween, the remainder of the fluid actuator means 14' as illustrated in FIG. 6 is both structurally and operationally similar to the fluid actuator means 14 illustrated in the embodiment of FIGS. 1–5.

The tool holder construction illustrated in FIG. 6, with the exception of the components described above, is otherwise identical to the construction illustrated in FIG. 1 and thus further description thereof if not believed necessary.

While both of the illustrated and described embodiments relate to tool holder constructions having an inner gripping sleeve adapted to be disposed in surrounding relationship to and radially contractible into gripping engagement with a tool, it will be readily apparent that the tool holder construction according to the present invention could also be utilized to cause radial expansion of an outer cammed sleeve portion for causing same to radially expand into gripping engagement with a tool having a portion disposed in surrounding relationship to the outer sleeve portion. For example, while the embodiment illustrated in FIG. 1 has the outer sleeve or housing part of rigid construction and has the inner sleeve 13 axially slotted to permit radial contraction thereof, it will be recognized that this structural relationship could be reversed so that the inner sleeve is rigid and the outer cammed sleeve is axially slotted so that the outer cammed sleeve will be radially expandable so as to be movable in gripping engagement with a work tool disposed in surrounding relationship thereto. Such a reversal is encompassed within the present invention.

Although a particular preferred embodiment of the invention has been disclosed in detail for illustrative purposes, it will be recognized that variations or modifications of the disclosed apparatus, including the rearrangement of parts, lie within the scope of the present invention. Particularly, it should be recognized that while the foregoing description and the accompanying drawings are directed primarily toward use of the invention for tool holders, and that such is a primary use of the invention as presently expected it is fully intended that at least the broader principles of the invention are also applicable to chucks of more general utility and that such use is fully contemplated.

The embodiments of the invention in which I claim an exclusive property or privilege are defined as follows:

1. A chuck construction for gripping and supporting an object, such as a tool, comprising:

elongated housing means having forward and rearward ends and including means associated with the rearward end for permitting said housing means to be mounted on a machine, said housing means having an axially elongated bore formed therein and extending axially inwardly from the front face of said housing means, said bore extending only partway through said housing means;

said housing means including an axially elongated annular housing portion surrounding said bore and having a plurality of circumferentially spaced, axially extending rows of cams on the inner surface thereof;

an axially elongated, inner sleevelike gripping member positioned within said bore and substantially concentric with said annular housing portion, said sleevelike gripping member having a plurality of circumferentially spaced, axially extending rows of cams on the outer surface thereof and positioned for engagement with the cams on said housing portion, said gripping member having the forward end thereof positioned closely adjacent the front face of said housing means and being adapted to receive therein and grip a portion of said object; and fluid actuator means for effecting relative axial movement of said housing portion and said gripping member while said cams are in engagement for causing said inner gripping member to be radially contracted into gripping engagement with said object, said fluid actuator means including a closed chamber means formed within said housing means and having a predetermined quantity of a substantially incompressible fluid substantially completely filling said chamber means, said chamber means including an annular ringlike recess formed within said housing means adjacent the rearward end of and substantially coaxially aligned with said sleevelike gripping member, said ringlike recess being positioned adjacent and in communication with the blind end of said bore;

said chamber means further including elongated passage means formed in said housing means and having a flow area substantially less than the flow area of said ringlike recess, one end of said passage means communicating with said recess, the other end of said passage means terminating at the outer surface of said housing means in the vicinity of the front face thereof;

said fluid actuator means including reaction means associated with said chamber means and coacting with said sleevelike gripping member for transmitting the pressure force developed by said fluid to said gripping member for displacing same axially toward the front face of said housing means, said reaction means including a ringlike annular piston member slidably disposed within said ringlike recess, said piston member being disposed in axial abutting engagement with the rearward end of said sleevelike gripping member but otherwise free of attachment thereto; and said fluid actuator means further including pressure creating means associated with said chamber means for permitting the fluid within said chamber means to be selectively pressurized, said pressure creating means including a manually movable actuating member movably mounted on said housing means and defining one of the boundaries of said chamber means whereby manual displacement of said actuating member causes a variation of the pressure of said fluid, said manually movable member comprising a screwlike member threadably engaged with said housing means adjacent said other end of said passage means and having a cross-sectional area substantially less than the cross-sectional area of said piston for creating a force magnification.

2. A chuck construction according to claim 1, wherein said chamber means is filled with a silicone gel.

* * * * *